(12) United States Patent
Mohammadi et al.

(10) Patent No.: US 11,632,188 B1
(45) Date of Patent: Apr. 18, 2023

(54) SELECTING MODULATION AND CODING SCHEME

(71) Applicant: NOKIA SOLUTIONS AND NETWORKS OY, Espoo (FI)

(72) Inventors: Jafar Mohammadi, Berlin (DE); Paolo Baracca, Munich (DE); Mahmoud Ramezani-Mayiami, Gerlingen (DE); Silvio Mandelli, Tamm (DE); Andreas Weber, Lehrensteinsfeld (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 17/953,828

(22) Filed: Sep. 27, 2022

(30) Foreign Application Priority Data

Sep. 28, 2021 (FI) .................................... 20216005

(51) Int. Cl.
*H04W 4/00* (2018.01)
*H04L 1/00* (2006.01)
*H04W 24/02* (2009.01)

(52) U.S. Cl.
CPC .......... *H04L 1/0003* (2013.01); *H04L 1/0073* (2013.01); *H04W 24/02* (2013.01)

(58) Field of Classification Search
CPC ....... H04L 1/003; H04L 1/0073; H04W 24/02
See application file for complete search history.

(56) References Cited

U.S. PATENT DOCUMENTS

2018/0035426 A1* 2/2018 Barriac ................ H04L 1/0007
2021/0036804 A1    2/2021 Zhu et al.

FOREIGN PATENT DOCUMENTS

CN  101072085 A * 11/2007
WO  2021/123494 A1  6/2021

OTHER PUBLICATIONS

Office Action dated Feb. 7, 2022 corresponding to Finnish Patent Application No. 20216005.
Finnish Search Report dated Feb. 7, 2022 corresponding to Finnish Patent Application No. 20216005.
Communication of Acceptance—section 29 a of Patents Decree dated Sep. 13, 2022 corresponding to Finnish Patent Application No. 20216005.
Vidit Saxena et al., "Model-Based Adaptive Modulation and Coding with Latent Thompson Sampling," In: 2021 IEEE 32nd Annual International Symposium on Personal, Indoor and Mobile Radio Communications (PIMRC), Sep. 13, 2021, pp. 610-616.

(Continued)

*Primary Examiner* — Erika A Washington
(74) *Attorney, Agent, or Firm* — Squire Patton Boggs (US) LLP

(57) ABSTRACT

A modulation and coding scheme for a transmission to an apparatus may be selected by at least sampling a posteriori probability distribution that has been calculated using a first probability distribution and a second probability distribution. The first probability distribution is calculated using at least a newest first feedback and a plurality of older first feedbacks, a first feedback indicating channel quality. The second probability distribution is calculated using at least a newest second feedback and a plurality of older second feedbacks, a second feedback indicating a success or failure of an earlier transmission transmitted from the apparatus.

17 Claims, 4 Drawing Sheets

(56) References Cited

OTHER PUBLICATIONS

Mateus P. Mota et al., "Adaptive Modulation and Coding based on Reinforcement Learning for 5G Networks," In: 2019 IEEE Globecom Workshops, Dec. 9, 2019.
Richard Combes et al., "Optimal Rate Sampling in 802.11 Systems: Theory, Design, and Implementation," In: IEEE Trans. on Mobile Computing, May 2019, vol. 18, No. 1, pp. 1145-1158.
Extended European Search Report corresponding to EP Appln. No. 22197893.5, dated Feb. 3, 2023.
Saxena Vidit et al., "Reinforcement Learning for Efficient and Tuning-Free Link Adaptation", IEEE Transactions on Wireless Communications, IEEE Service Center, Pscataway, NJ, US, vol. 21, No. 2, Jul. 28, 2021, XP011900157, pp. 768-780.
Saxena Vidit et al., "Bayesian Link Adaptation under a BLER Target", 2020 IEEE 21st International Workshop on Signal Processing Advances in Wireless Communications (SPAWC), IEEE, May 26, 2020, XP033803786, pp. 1-5.

* cited by examiner

SELECTING MODULATION AND CODING SCHEME

TECHNICAL FIELD

Various example embodiments relate to wireless communications.

BACKGROUND

Wireless communication systems are under constant development. Different services require that different traffic types are to be handled, some posing requirements in terms of data rate, some in terms of latency and reliability. Channel conditions affect how the requirements can be achieved. One way to take the channel conditions into account is to use link adaptation in which a coding and modulation scheme is selected for a transmission amongst various combinations of coding and modulation schemes to adapt the transmission to channel conditions.

BRIEF DESCRIPTION

According to an aspect there is provided an apparatus comprising at least one processor; and at least one memory including computer program code, the at least one memory and computer program code being configured to, with the at least one processor, cause the apparatus at least to perform: calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus; selecting, in response to a transmission to be transmitted from the apparatus, a modulation and coding scheme for the transmission by at least sampling the posteriori probability distribution; and using the selected modulation and coding scheme for the transmission.

In an embodiment, the at least one memory and computer program code are configured to, with the at least one processor, cause the apparatus further at least to perform: convolving, prior to selecting, the posteriori probability distribution to a higher variance Gaussian probability distribution; and performing the selecting by sampling the higher variance Gaussian probability distribution.

In embodiments, the at least one memory and computer program code are configured to, with the at least one processor, cause the apparatus further at least to perform: updating, in response to receiving a new first feedback, the posteriori probability distribution by using as the newest first feedback the new first feedback, and the previous newest first feedback as one of the older first feedbacks; and updating, in response to receiving a new second feedback, the posteriori probability distribution by using as the newest second feedback the new second feedback, and the previous newest second feedback as one of the older first feedbacks.

In embodiments, wherein historical data comprises at least the newest first feedback, the plurality of the older first feedbacks, the newest second feedback and the plurality of the older second feedbacks, the at least one memory and computer program code are configured to, with the at least one processor, cause the apparatus further at least to perform: adding, in response to receiving a first feedback or a second feedback, the first feedback or the second feedback to the historical data and updating the posteriori probability distribution; and using a sliding window when calculating the first probability distribution and the second probability distribution.

In embodiments, wherein historical data comprises at least the newest first feedback, the plurality of the older first feedbacks, the newest second feedback and the plurality of the older second feedbacks, the at least one memory and computer program code are configured to, with the at least one processor, cause the apparatus further at least to perform: calculating the first probability distribution using a first batch comprising at least a predefined amount of first feedbacks from the historical data, and the second probability distribution using a second batch comprising at least the predefined amount of second feedbacks from the historical data; in response to receiving a new first feedback, adding the new first feedback to the first batch and removing the oldest first feedback from the first batch, and updating the posteriori probability distribution; and in response to receiving a new second feedback, adding the new second feedback to the second batch and removing the oldest second feedback from the second batch, and updating the posteriori probability distribution.

In embodiments, wherein historical data comprises at least the newest first feedback with time information, the plurality of the older first feedbacks with time information, the newest second feedback with time information and the plurality of the older second feedbacks with time information, the at least one memory and computer program code are configured to, with the at least one processor, cause the apparatus further at least to perform: applying, before calculating the posteriori probability distribution, a forgetting factor, whose value increase with time, to the historical data; and calculating, after applying the forgetting factor, the first probability distribution and the second probability distribution to calculate the posteriori probability distribution.

In embodiments, wherein at least one cell area provided by the apparatus is divided into two or more regions, the at least one memory and computer program code are configured to, with the at least one processor, cause the apparatus further at least to perform: associating feedback with corresponding location information by performing, per a first feedback received from a reporting device, determining a location of the reporting device, and associating the first feedback with the location, and, per a second feedback received to an earlier transmission to a receiving device, associating the second feedback with a location of the receiving device determined for the earlier transmission, or determining and associating the second feedback with a location wherefrom the second feedback is received; calculating, per a region, a posteriori probability distribution of the region, using first feedbacks having location within the region and second feedbacks having location within the region; determining, when there is a transmission to a receiving device, a location of the receiving device; determining, based on the location of the receiving device, the region within which the receiving device is; and using the posteriori probability distribution of the corresponding region when selecting the modulation and coding scheme for the transmission.

In embodiments, the posteriori probability distribution is a posteriori probability distribution for signal-to-interference-to-noise ratios, which is based on Thompson sampling algorithm, signal-to-interference-to noise ratios conditioned at least on the first feedbacks, and the signal-to-interference-to noise ratios conditioned at least on the second feedbacks.

In embodiments, the posteriori probability distribution is a posteriori probability distribution for modulation and coding schemes, which is based on Thompson sampling algorithm, modulation and coding schemes conditioned at least on the first feedbacks, and the modulation and coding schemes conditioned at least on the second feedbacks, and wherein the at least one memory and computer program code configured to, with the at least one processor, cause the apparatus further at least to perform storing of selected modulation and coding schemes.

According an aspect there is provided a method for an apparatus, the method comprising: calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus; selecting, in response to a transmission to be transmitted from the apparatus, a modulation and coding scheme for the transmission by at least sampling the posteriori probability distribution; and using the selected modulation and coding scheme for the transmission.

In an embodiment, the method further comprises: convolving, prior to selecting, the posteriori probability distribution to a higher variance Gaussian probability distribution; and performing the selecting by sampling the higher variance Gaussian probability distribution.

In embodiments, the method further comprises: updating, in response to receiving a new first feedback, the posteriori probability distribution by using as the newest first feedback the new first feedback, and the previous newest first feedback as one of the older first feedbacks; and updating, in response to receiving a new second feedback, the posteriori probability distribution by using as the newest second feedback the new second feedback, and the previous newest second feedback as one of the older first feedbacks.

In embodiments, wherein historical data comprises at least the newest first feedback, the plurality of the older first feedbacks, the newest second feedback and the plurality of the older second feedbacks, the method further comprises: adding, in response to receiving a first feedback or a second feedback, the first feedback or the second feedback to the historical data and updating the posteriori probability distribution; and using a sliding window when calculating the first probability distribution and the second probability distribution.

In embodiments, wherein historical data comprises at least the newest first feedback, the plurality of the older first feedbacks, the newest second feedback and the plurality of the older second feedbacks, the method further comprises: calculating the first probability distribution using a first batch comprising at least a predefined amount of first feedbacks from the historical data, and the second probability distribution using a second batch comprising at least the predefined amount of second feedbacks from the historical data; in response to receiving a new first feedback, adding the new first feedback to the first batch and removing the oldest first feedback from the first batch, and updating the posteriori probability distribution; and in response to receiving a new second feedback, adding the new second feedback to the second batch and removing the oldest second feedback from the second batch, and updating the posteriori probability distribution.

In embodiments, wherein historical data comprises at least the newest first feedback with time information, the plurality of the older first feedbacks with time information, the newest second feedback with time information and the plurality of the older second feedbacks with time information, the method further comprises: applying, before calculating the posteriori probability distribution, a forgetting factor, whose value increase with time, to the historical data; and calculating, after applying the forgetting factor, the first probability distribution and the second probability distribution to calculate the posteriori probability distribution.

In embodiments, wherein at least one cell area is divided into two or more regions, the method further comprises: associating feedback with corresponding location information by performing, per a first feedback received from a reporting device, determining a location of the reporting device, and associating the first feedback with the location, and, per a second feedback received to an earlier transmission to a receiving device, associating the second feedback with a location of the receiving device determined for the earlier transmission, or determining and associating the second feedback with a location wherefrom the second feedback is received; calculating, per a region, a posteriori probability distribution of the region, using first feedbacks having location within the region and second feedbacks having location within the region; determining, when there is a transmission to a receiving device, a location of the receiving device; determining, based on the location of the receiving device, the region within which the receiving device is; and using the posteriori probability distribution of the corresponding region when selecting the modulation and coding scheme for the transmission.

In embodiments of the method, the posteriori probability distribution is a posteriori probability distribution for signal-to-interference-to-noise ratios, which is based on Thompson sampling algorithm, signal-to-interference-to noise ratios conditioned at least on the first feedbacks, and the signal-to-interference-to noise ratios conditioned at least on the second feedbacks.

In embodiments of the method, the posteriori probability distribution is a posteriori probability distribution for modulation and coding schemes, which is based on Thompson sampling algorithm, modulation and coding schemes conditioned at least on the first feedbacks, and the modulation and coding schemes conditioned at least on the second feedbacks, and wherein the at least one memory and computer program code configured to, with the at least one processor, cause the apparatus further at least to perform storing of selected modulation and coding schemes.

According to an aspect there is provided an apparatus comprising means for performing the above method or any of its embodiments.

According to an aspect there is provided a computer readable medium comprising program instructions for causing an apparatus to perform at least the following: calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus; selecting, in response to a transmission to be transmitted from the apparatus, a modulation and coding scheme for the transmission by at least sampling the posteriori probability distribution; and using the selected modulation and coding scheme for the transmission.

In an embodiment, the computer readable medium is a non-transitory computer readable medium.

According to an aspect there is provided a non-transitory computer readable medium comprising program instructions for causing an apparatus to perform at least the following: calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus; selecting, in response to a transmission to be transmitted from the apparatus, a modulation and coding scheme for the transmission by at least sampling the posteriori probability distribution; and using the selected modulation and coding scheme for the transmission.

According to an aspect there is provided a computer program comprising instructions for causing an apparatus to perform at least the following: calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus; selecting, in response to a transmission to be transmitted from the apparatus, a modulation and coding scheme for the transmission by at least sampling the posteriori probability distribution; and using the selected modulation and coding scheme for the transmission.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G, 6G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
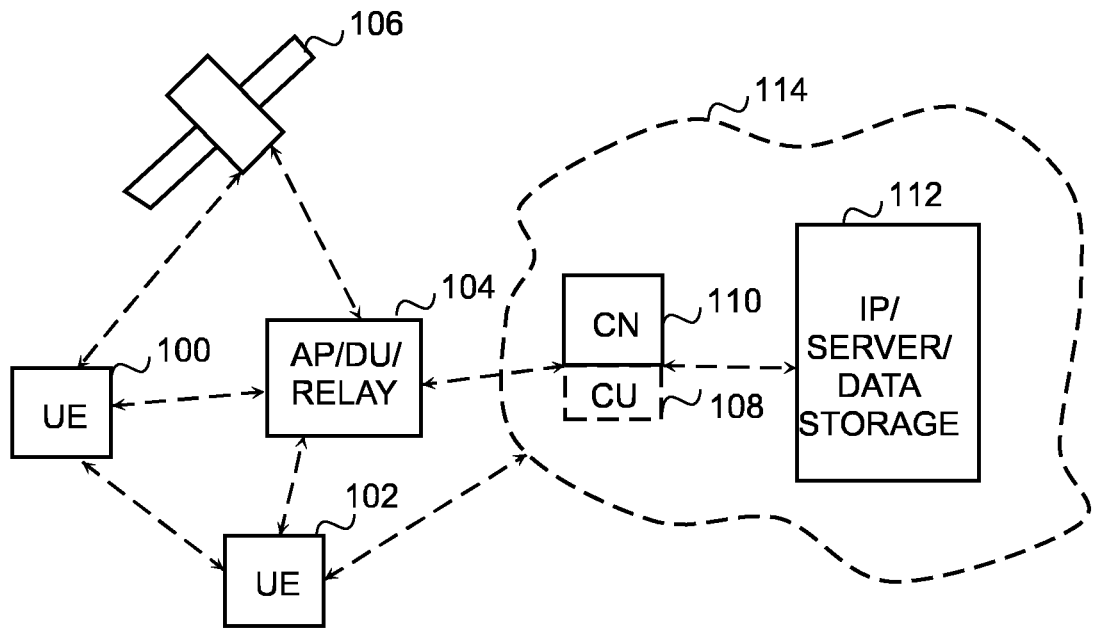
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), or access and mobility management function (AMF), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz -cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that a device's location (position) is estimated by a core network element called a location management function, LMF. However, at least part of the location management function may be distributed to be performed at the radio access network, or even in the devices. There are several ways how the device's location can be estimated. For example, the device's location may be estimated using transmission/reception point signal measurements, or using beamspace processing, in which an estimate of the angle of arrival and/or angle of departure is used for estimating the device's location. Still a further example is channel charting, which uses dimensionality reduction techniques to generate a pseudo-map of the wireless channel, and associates the device using its channel state information to a pseudo-location which can be tracked consistently across devices and over time.

One of the key features in 5G networks is ultra-reliable and low latency communications (URLLC) service category, to enable latency sensitive wide-ranging applications, like factory automation, autonomous driving, industrial internet and smart grid, for example. In 5G, the latency requirement for URLLC is 1 ms or less, and an average long term block error rate (BLER) should be less than 0.001, the average long term block error rate describing a target error probability.

In networks beyond 5G the requirements may be even stricter. This means that retransmissions with hybrid automatic repeat request (HARQ) can either be used only to a certain extent, for example with a maximum of 1 retransmission, or not be used at all. The feedback from a transmission comes with a delay, and the channel conditions for a transmission are not known before the transmission takes place, a modulation and coding scheme for a transmission is based on earlier feedback. Selecting, for certainty, a pessimistic modulation and coding scheme (MCS), for example a modulation and coding scheme with a low index, may cause waste of resources which will limit the maximum data rate, or the maximum number of devices that can use URRLC services simultaneously because the channel quality is better than assumed based on the preceding feedback. On the other hand, selecting an optimistic modulation and coding scheme, for example a modulation and coding scheme with a high index, may in turn cause that the requirements are not achieved because the channel quality is lower than assumed and more retransmissions are hence needed.

In addition to received feedbacks on success or failure (ACK/NACK) of transmission, in 5G and beyond, channel quality information, for example channel quality indicator (CQI) is received frequently. Both feedbacks are maintained as a historical data. The historical data may comprise also other information, as will be explained below. The historical data may be maintained/stored per a cell, or per a group of cells, or per a region within a cell. In other words, a cell area, covering one or more cells or part of a cell, may be divided into two or more regions (size of which may vary), and the historical data may be maintained/stored per such a region. The historical data may comprise data accumulated during a certain period, for example a day, a half day, or a week, depending, for example whether the cell, or group of the cells are in a rural area, in an urban area, or is a private cell, etc. In the below examples, a feedback on channel quality information may be called a first feedback, or a quality feedback, and a feedback on success or failure may be called a second feedback, or ACK feedback. Since the feedbacks reflect signal-to-interference-to-noise ratio and are independent of each other, the historical data, including newest corresponding values, can be used for selecting a modulation and coding scheme, using at least principled disclosed in FIG. 2. In the below examples it is assumed, that the modulation and coding scheme is selected for a target error probability (block error rate in 5G), or a corresponding reliability requirement, even though not explicitly mentioned with some of the examples.

Figure 2:
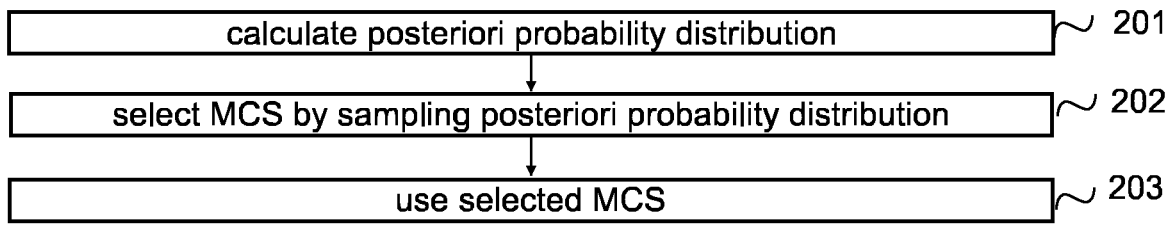
FIGS. 2 to 11 are flow charts illustrating example functionalities.

Referring to FIG. 2, a posteriori probability distribution (a posteriori joint conditional probability distribution) is calculated in block 201 using a first probability distribution and a second probability distribution. The first probability distribution is calculated using at least a newest first feedback and a plurality of older first feedbacks, a first feedback indicating the channel quality, as said above. The second probability distribution is calculated using at least a newest second feedback and a plurality of older second feedbacks, a second feedback indicating a success or failure of a transmission transmitted from the apparatus as said above. Then, when there is a transmission to be transmitted, a modulation and coding scheme (MCS) for the transmission is selected in block 202 by sampling the posteriori probability distribution calculated in block 201. (The posteriori probability distribution calculated in block 201 is a priori probability distribution for the new transmission.) The sampling may be performed using any sampling method, for example inverse transform sampling may be used. The transmission is then transmitted using in block 203 the modulation and coding scheme selected.

It should be appreciated that the posteriori probability distribution may be calculated also after there is data to be transmitted.

Figure 3:
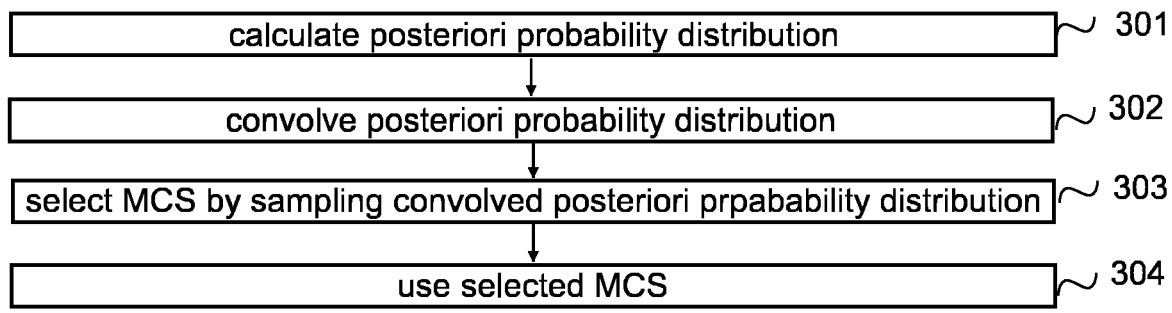

Discrete nature of probability mass functions, which may be used for calculating the probability distribution, may result that the posteriori probability distribution locates in one of the quantization bins, rendering the sampling meaningless. FIG. 3 illustrates a further example, which is based on the example of FIG. 2, but takes into account the discrete nature.

Referring to FIG. 3, a posteriori probability distribution is calculated in block 301, in a similar way as described above with block 201. Then, the posteriori probability distribution is convolved in block 302, for example using equation (1):

$$p_{PPD}^{wide}{}_{[t+1]}[ppd] = P_{PPD[t+1]}[ppd] * N(0, \sigma^2)$$

wherein
$p_{PPD}^{wide}{}_{[t+1]}[ppd]$ is the convolved posteriori probability distribution,
$P_{PPD[t+1]}$ is the posteriori probability distribution,
* denotes the convolution operator, and
$N(0, \sigma^2)$ is the Normal distribution with zero mean and variance $\sigma^2$.

The variance $\sigma^2$ acts as an exploitation-exploration trade off parameter. The bigger the value, the wider the range of posteriori probability distributions there is, wherefrom to sample. A numerical value for the variance depends on a volatility of the historical data and it can be found based on numerical search over possible options. For example, the value is preferably greater than 0.45 if the historical data is highly dynamic, whereas a smaller value, for example a value greater than 0.2 may be used if the historical data set is deterministic.

After the posteriori probability distribution has been convolved, when there is a transmission to be transmitted, a modulation and coding scheme (MCS) for the transmission is selected in block 303 by sampling the convolved posteriori probability distribution, for example using a sampling method described above with block 202. It should be noted that in block the target error probability is used for finding a right percentile, and thereby the right sample. The transmission is then transmitted using in block 304 the modulation and coding scheme selected.

It should be appreciated that the posteriori probability distribution may be calculated and convolved whenever feedback is received, or the posteriori probability distribution may be calculated whenever feedback is received but convolved only when there is data to be transmitted.

Figure 4:
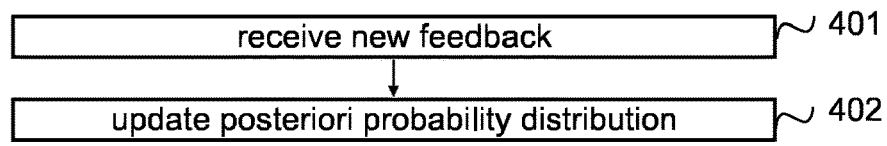

Referring to FIG. 4, whenever a new feedback is received (block 401), be that the quality feedback (first feedback), or the ACK feedback (second feedback), the posteriori probability distribution is updated in block 402, meaning the block 201 or block 301 is performed. In other words, a new (updated) posteriori probability distribution is calculated in 201 using an updated first probability distribution and/or an updated second probability distribution, and used when there is next time data to be transmitted to select the modulation and coding scheme. In an implementation, the first probability distribution and the second probability distribution are maintained temporarily in a memory, so that in block 402 the one in the memory for which no new feedback is received can be used, whereas for the other one a new probability distribution is calculated using the new feedback. In another implementation both probability distributions are calculated whenever a new feedback is received.

Figure 5:
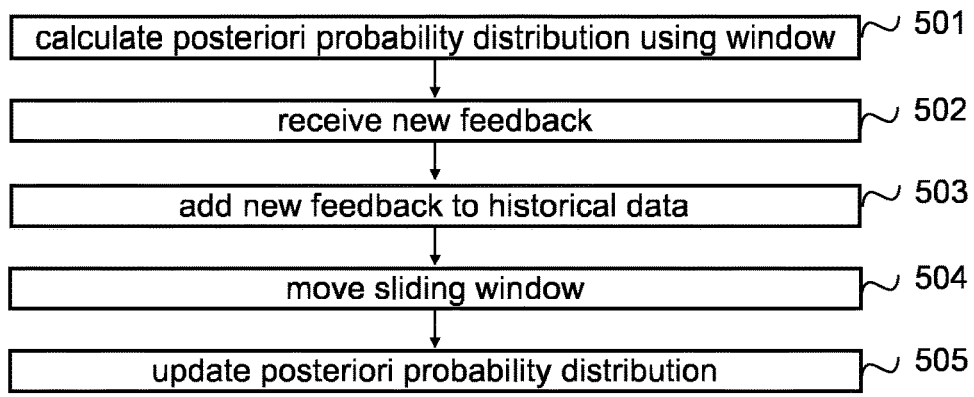
Figure 6:
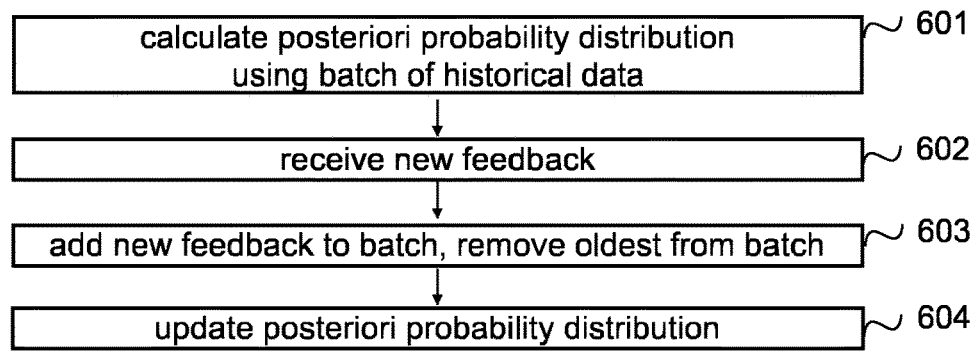
Figure 7:
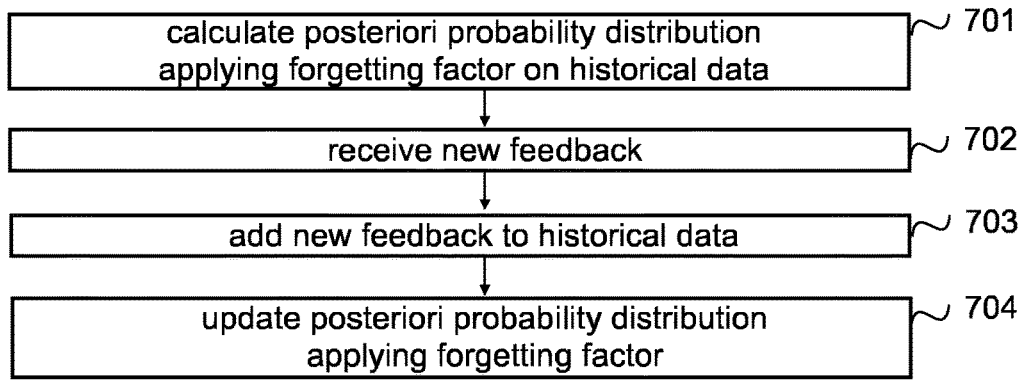

The historical data comprising at least the first feedback and the second feedback may be huge, and comprise old feedback. Hence time may be taken into account when calculating the posteriori probability distribution, or more precisely, the first probability distribution and the second probability distribution. FIGS. 5 to 7 disclose different examples how time may be taken into account.

Referring to FIG. 5, a window having a predefined window size x (the value of the window size x may be freely set) is used when feedbacks from the historical data are taken in block 501 to calculate the posteriori probability distribution. More precisely, x newest first feedbacks are used to calculate the first probability distribution and x newest second feedbacks are used to calculate the second probability distribution. Whenever a new feedback is received (block 502), the new feedback is added in block 503 to the historical data, and the corresponding sliding window is moved in block 504 to include the new received feedback (resulting that oldest feedback used in block 501 is not any more within the sliding window and). Then the posteriori probability distribution is updated in block 505, as described above, using feedback in the corresponding sliding windows. Use of the sliding window allows to delete from the historical data old feedback that is not any more within the sliding windows current positions.

FIG. 6 illustrates a solution in which a batch of historical data is used. In other words, only a certain portion, for example y first feedback and y second feedback of the historical data may be in the memory.

Referring to FIG. 6, a batch of feedbacks from the historical data are used in block 601 to calculate the posteriori probability distribution. More precisely, a batch of first feedbacks are used to calculate the first probability distribution and corresponding batch of second feedbacks are used to calculate the second probability distribution. Whenever a new feedback is received (block 602), the new feedback is added in block 603 to the batch and the oldest feedback in the batch is removed (block 603). Then the posteriori probability distribution is updated in block 604, as described above, using feedback in the corresponding batches.

Still a further possibility to take the time into account, either implemented with the process of FIG. 5 or with the process of FIG. 6, or without neither, is to use a forgetting factor. A value of the forgetting factor increases with time, if the forgetting factor is applied by dividing, or decreases with time, if the forgetting factor is applied by multiplying. The value may increase/decrease, for example, exponentially. The historical data preferably contains the feedback associated with time information, which may be used to select, per a feedback, a value to be used with the forgetting factor. Alternatively, feedbacks may be maintained in the receiving order, the order indicating the time.

Referring to FIG. 7, the forgetting factor, or more precisely different time dependent values of the forgetting factor are applied on the historical data in block 701 to calculate the posteriori probability distribution. More precisely, the forgetting factor is applied to first feedbacks, based on corresponding time information, before the first probability distribution is calculated and correspondingly, the forgetting factor is applied to second feedbacks, based on corresponding time information before the second probability distribution is calculated. Whenever a new feedback is received (block 702), the new feedback is added in block 703 to the historical data with its time information, and the posteriori probability distribution is updated in block 704 by applying the forgetting factor to the current set of historical data.

Figure 8:
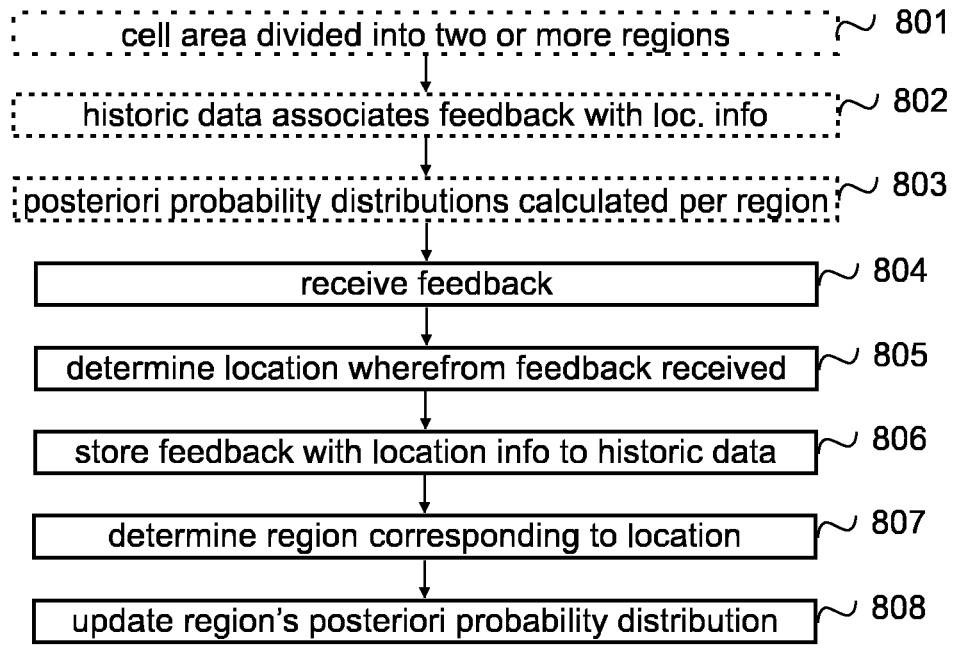
Figure 9:
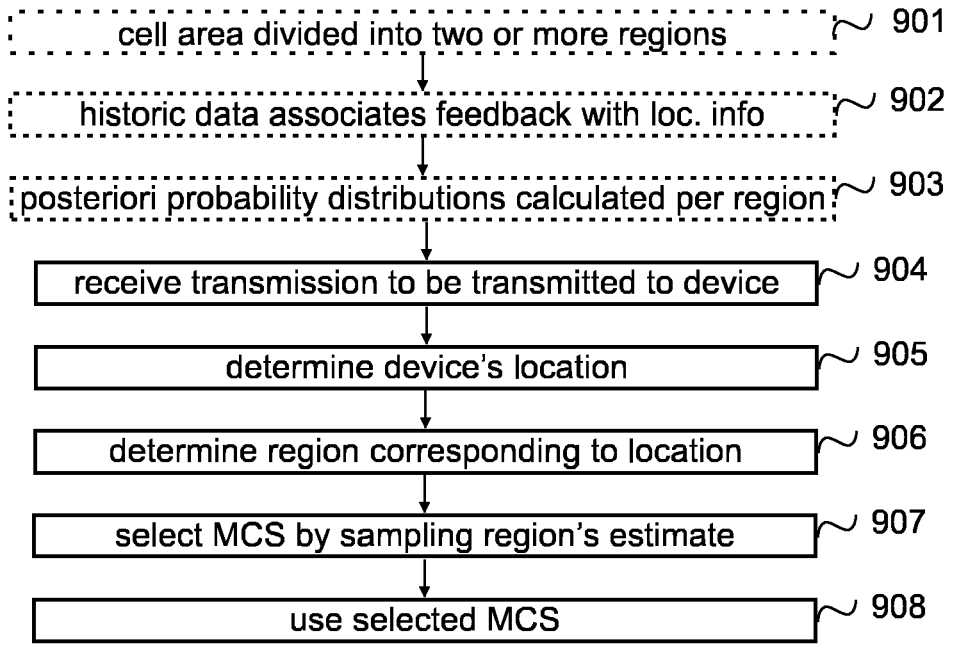

In one implementation, which may be combined with any of the above described examples, location information of devices may be taken into account, for example using any of the above discussed ways to determine a location of a device. FIGS. 8 and 9 describe different examples relating to the implementation. In the illustrated examples, it is assumed, for the sake of description, without limiting the implementation to such a solution, that a cell area is a cell, which is divided into two or more regions (block 801 with broken line in FIG. 8 and block 901 with broken line in FIG. 9). Further, it is assumed that the historical data associates a feedback with a location (block 802 with broken line in FIG. 8 and block 902 with broken line in FIG. 9), as will be described below. Further, in the examples it is assumed that there already exists (block 803 with broken line in FIG. 8 and block 903 with broken line in FIG. 9) posteriori probability distributions, a posteriori probability distribution per a region (a posteriori joint conditional probability distribution per a region). To calculate a posteriori probability distribution per a region, first feedbacks, associated with location information indicating that the location is within the region, are used when the first probability distribution is calculated, and correspondingly second feedbacks associated with location information indicating that the location is within the region are used when the second probability distribution is calculated.

Referring to FIG. 8, when a feedback is received (block 804), the location wherefrom the feedback was received, is determined in block 805. If the feedback is an ACK feedback (second feedback) of a transmitted packet, for example, the location of the device, which was used when a modulation and coding scheme for the transmission of packet was selected, may be used in block 805 as the location. However, it is also possible to redetermine the location, i.e. use the location of the device when the ACK feedback was sent. If the feedback is quality feedback (first feedback), the location is determined in block 805. Then the feedback with the location information is stored in block 806 to the historical data. Further, a region within which the location is, is determined in block 807, and the region's posteriori probability distribution, is updated in block 808 using the received feedback, as described above.

Referring to FIG. 9, when a transmission to be transmitted to a device is received (block 904), the location of the device is determined in block 905. Then a region within which the location is, is determined in block 906, and a modulation and coding scheme for the transmission is determined by sampling the region's posteriori probability distribution, or convolved posteriori probability distribution if convolving is used, as described above.

By using the regions, different channel conditions in different parts of a cell, for example near the edge of the cell or in close vicinity of transmitting antennas, can be taken into account, and thereby even more optimize the use of resources while achieving target error conditions and other quality of service requirements.

The posteriori probability distribution may be obtained by calculating probability distributions based on Kernel method or Histogram, then applying Bayes' theorem and self-normalization to calculate from the probability distributions the posteriori probability distribution, which may be sampled using Thompson sampling algorithm. The posteriori probability distribution may be calculated for signal-to-interference-to-noise ratio or for modulation and coding scheme, provided that the historical data comprises also selected modulation and coding schemes.

Figure 10:
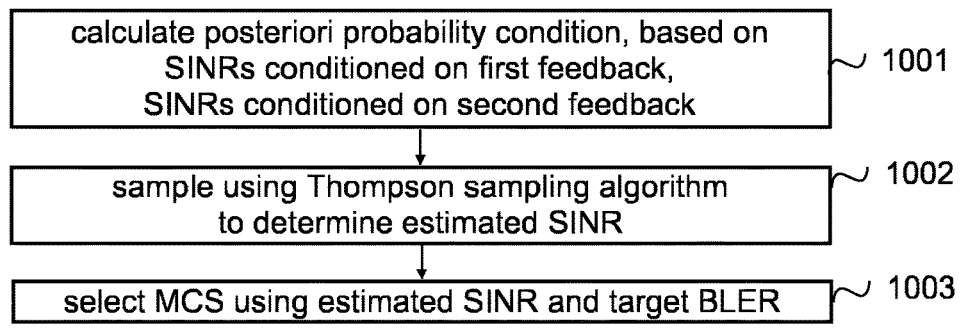

Referring to FIG. 10, the posteriori probability distribution may be calculated in block 1001 for signal-to-interference-to-noise ratio SINR, in which signal-to-interference-to-noise ratios are conditioned on the first feedbacks (quality feedback) and the signal-to-interference-to-noise ratios are conditioned on the second feedbacks (quality feedback), using following formula:

$$P = P_{SIN\ R[t+1]}[\sin r | ack, cqi]$$

$$P = \frac{P[cqi \mid SINR = sinr] \times P[ack \mid SINR = sinr] \times P_{SINR}[sinr]}{\int_{SINR[t]} P[cqi \mid SINR = sinr] \times P[ack \mid SINR = sinr] \times P_{SINR}[sinr] dSINR}$$

wherein
P is the posteriori probability distribution
SIN R is the signal-to-interference-to-noise ratio
ack is the ACK feedback (second feedback)
cqi is the quality feedback (first feedback)
t+1 denotes future, i.e. time for which no feedback yet have been received
t denotes time
P[cqi|SIN R=sin r ] depicts the first probability distribution
P[ack|SIN R=sin r ] depicts the second probability distribution.

In the implementations, in which location is used, the first probability distribution and the second probability distributions are replaced using following distributions:
P[cqi|SIN R=sin r, L=(x, y, z)],
P[ack|SIN R=sin r, L=(x, y, z) ]
wherein
L is the location information that indicates the position of a device.

When the posteriori probability distribution has been calculated (block 1001), and sampled in block 1002 using Thompson sampling algorithm to determine estimated a signal-to-interference-to noise ratio, the modulation and coding scheme is selected in block 1003 using the estimated signal-to-interference-to noise ratio. a target block error rate and predefined block error rate waterfall curves (or corresponding calculations).

Figure 11:
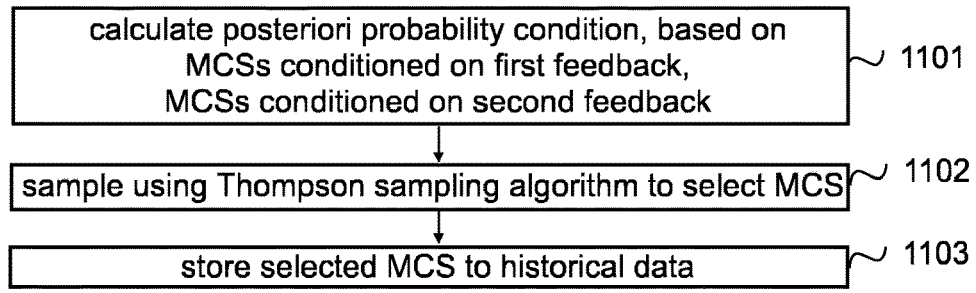

Referring to FIG. 11, the posteriori probability distribution may be calculated in block 1201 for modulation and coding scheme MCS, in which modulation and coding schemes are conditioned on the first feedbacks (quality feedback) and the modulation and coding schemes are conditioned on the second feedbacks (ACK feedback), using following formula, and the historical data comprising in addition to the feedbacks at least selected modulation coding schemes:

$$P = P_{MCS[t+1]}[mcs | ack, cqi]$$

$$P = \frac{P[cqi \mid MCS = mcs] \times P[ack \mid MCS = mcs] \times P_{MCS}[mcs]}{\int_{MCS[t]} P[cqi \mid MCS = mcs] \times P[ack \mid MCS = mcs] \times P_{MCS}[mcs] dMCS}$$

wherein
P is the posteriori probability distribution
MCS is the modulation and coding scheme
ack is the ACK feedback (second feedback)
cqi is the quality feedback (first feedback)
t+1 denotes future, i.e. time for which no feedback yet have been received
t denotes time
P[cqi|MCS=mcs] is the first probability distribution
P[ack|MCS=mcs] is the second probability distribution.

In the implementations, in which location is used, the first probability distribution and the second probability distributions are replaced using following distributions:
P[cqi|MCS=mcs, L=(x, y, z) ],
P[ack|MCS=mcs, L=(x, y, z) ]
wherein
L is the location information that indicates the position of a device.

When the posteriori probability distribution has been calculated (block 1101), the modulation and coding scheme is selected in block 1102 by sampling the posteriori probability distribution using the Thompson sampling algorithm, and the modulation and coding scheme selected is stored in block 1103 to the historical data.

It should be appreciated that in the above examples of FIGS. 10 and 11, the posteriori probability distribution may be convolved using the equation (1) before performing the sampling.

Figure 12:
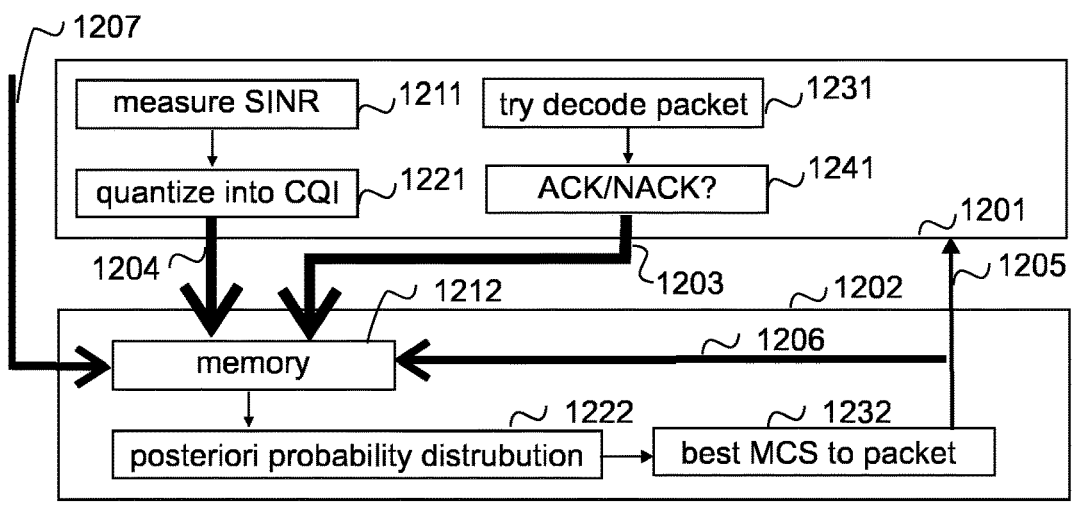
FIGS. 12 and 13 are schematic block diagrams.

FIG. 12 is a schematic block diagram illustrating on a high-level principles how historical data may be collected and used.

Referring to FIG. 12, a device 1201 receives a packet 1205, which is transmitted from an access node 1202 to the device 1201 using a selected best modulation and coding scheme MCS. The device 1201 tries (block 1231) to decode the packet, and the outcome (decoding succeeds or not) is reported (block 1241) and sent in a second feedback (ACK feedback) 1203 to the access node 1202. The access node 1202 stores the second feedback 1203 into its memory 1212. In 5G, the second feedback may be sent for every single transmission as one bit information. Further, the device measures (block 1211), according to its configuration, channel quality. In the illustrated example, the device measures (block 1211) signal-to-interference-to-noise ratio SINR, which the device quantizes (block 1221) into a channel quality indicator CQI, and sends the channel quality indicator as a first feedback 1204 to the access node 1202. In 5G, the channel quality indicator is four bits long information. The access node stores the first feedback 1204 into its memory 1212. With normal data traffic, the first feedback is received for every 10 or even for every 20 transmissions. In other words, 10 or even 20 second feedbacks may be received between two consecutive first feedbacks.

In some scenarios, the access node 1202 receives a location 1207 of the device. The access node 1202 may store the location into its memory 1212.

In some implementations, the used modulation and coding scheme 1206 in transmission 1205 is stored into the memory 1212.

The historical data in the memory 1212 thus comprises, depending on the implementation the first feedbacks and the second feedbacks, or the first feedbacks, the second feedbacks and locations, or the first feedbacks, the second feedbacks and the used modulation and coding schemes, or the first feedbacks, the second feedbacks, the locations and the used modulation and coding schemes.

Using the historical data in the memory 1212, the access node calculates (block 1222), as described above, posteriori probability distributions and selects (block 1232), as described above, a best modulation and coding scheme for a packet to be transmitted, and transmits (1205) the packet using the selected best modulation and coding scheme.

The blocks, related functions, and information exchanges described above by means of FIGS. 2 to 12 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 13:
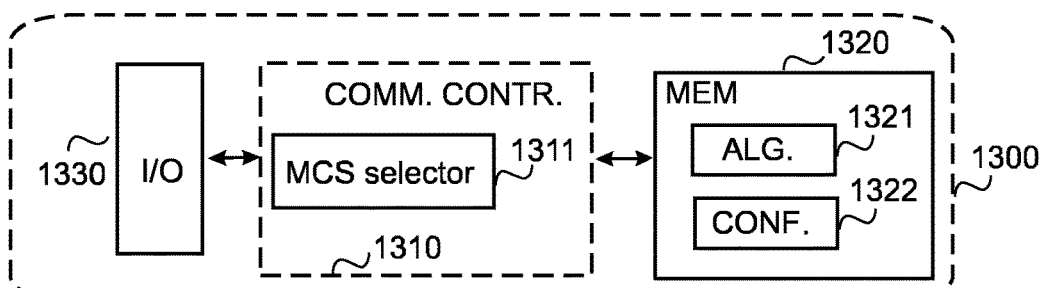

FIG. 13 illustrate an apparatus comprising a communication controller 1310, such as at least one processor or processing circuitry, and at least one memory 1320 including a computer program code (software, algorithm) ALG. 1321, wherein the at least one memory and the computer program code (software, algorithm) are configured, with the at least one processor, to cause the apparatus to carry out any one of the embodiments, examples and implementations described above. FIG. 13 illustrates an apparatus configured to provide an access point (base station). The apparatuses of FIG. 13 may be an electronic device, examples being listed above with FIG. 1.

Referring to FIG. 13, the memory 1320 may be implemented using any suitable data storage technology, such as semiconductor based memory devices, flash memory, magnetic memory devices and systems, optical memory devices and systems, fixed memory and removable memory. The memory may comprise a configuration storage CONF. 1321, such as a configuration database, for example for storing historical data. The memory 1320 may further store a data buffer for data waiting to be processed (including transmission).

Referring to FIG. 13, the apparatus, for example a gNB or a distributed unit or an access point or any corresponding device or apparatus or node providing or serving devices in a cell, comprises a communication interface 1330 comprising hardware and/or software for realizing communication connectivity according to one or more wireless and/or wired communication protocols. The communication interface 1330 may provide the apparatus with radio communication capabilities, as well as communication capabilities towards a wired network.

Digital signal processing regarding transmission and reception of signals may be performed in a communication controller 1310. The communication interface may comprise standard well-known components such as an amplifier, filter, frequency-converter, (de)modulator, and encoder/decoder circuitries and one or more antennas.

The communication controller 1310 comprises a modulation and coding scheme selecting circuitry 1311 (MCS selector) configured at least to select modulation and coding schemes for transmissions according to any one of the embodiments/examples/implementations described above.

The communication controller 1310 may control the modulation and coding scheme selecting circuitry 1311. Further, the communication controller 1310 may control information exchange according to a corresponding configuration.

In an embodiment, at least some of the functionalities of the apparatus of FIG. 13 may be shared between two physically separate devices, forming one operational entity. Therefore, the apparatus may be seen to depict the operational entity comprising one or more physically separate devices for executing at least some of the processes described above.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 12 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 12, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 12 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
   at least one processor; and
   at least one memory including computer program code, the at least one memory and computer program code configured to, with the at least one processor, cause the apparatus at least to perform:
   calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus;

convolving the posteriori probability distribution to a higher variance Gaussian probability distribution;

selecting, in response to a transmission to be transmitted from the apparatus, a modulation and coding scheme for the transmission by at least sampling the higher variance Gaussian probability distribution; and using the selected modulation and coding scheme for the transmission.

2. The apparatus of claim 1, wherein the at least one memory and computer program code configured to, with the at least one processor, cause the apparatus further at least to perform:

updating, in response to receiving a new first feedback, the posteriori probability distribution by using as the newest first feedback the new first feedback, and the previous newest first feedback as one of the older first feedbacks; and updating, in response to receiving a new second feedback, the posteriori probability distribution by using as the newest second feedback the new second feedback, and the previous newest second feedback as one of the older first feedbacks.

3. The apparatus of claim 1, wherein historical data comprises at least the newest first feedback, the plurality of the older first feedbacks, the newest second feedback and the plurality of the older second feedbacks, and wherein the at least one memory and computer program code configured to, with the at least one processor, cause the apparatus further at least to perform:

adding, in response to receiving a first feedback or a second feedback, the first feedback or the second feedback to the historical data and updating the posteriori probability distribution; and using a sliding window when calculating the first probability distribution and the second probability distribution.

4. The apparatus of claim 1, wherein historical data comprises at least the newest first feedback, the plurality of the older first feedbacks, the newest second feedback and the plurality of the older second feedbacks, and wherein the at least one memory and computer program code configured to, with the at least one processor, cause the apparatus further at least to perform:

calculating the first probability distribution using a first batch comprising at least a predefined amount of first feedbacks from the historical data, and the second probability distribution using a second batch comprising at least the predefined amount of second feedbacks from the historical data;

in response to receiving a new first feedback, adding the new first feedback to the first batch and removing the oldest first feedback from the first batch, and updating the posteriori probability distribution; and in response to receiving a new second feedback, adding the new second feedback to the second batch and removing the oldest second feedback from the second batch, and updating the posteriori probability distribution.

5. The apparatus of claim 1, wherein historical data comprises at least the newest first feedback with time information, the plurality of the older first feedbacks with time information, the newest second feedback with time information and the plurality of the older second feedbacks with time information, and wherein the at least one memory and computer program code configured to, with the at least one processor, cause the apparatus further at least to perform:

applying, before calculating the posteriori probability distribution, a forgetting factor, whose value increase with time, to the historical data; and calculating, after applying the forgetting factor, the first probability distribution and the second probability distribution to calculate the posteriori probability distribution.

6. The apparatus of claim 1, wherein at least one cell area provided by the apparatus is divided into two or more regions, the at least one memory and computer program code configured to, with the at least one processor, cause the apparatus further at least to perform:

associating feedback with corresponding location information by performing, per a first feedback received from a reporting device, determining a location of the reporting device, and associating the first feedback with the location, and, per a second feedback received to an earlier transmission to a receiving device, associating the second feedback with a location of the receiving device determined for the earlier transmission, or determining and associating the second feedback with a location wherefrom the second feedback is received;

calculating, per a region, a posteriori probability distribution of the region, using first feedbacks having location within the region and second feedbacks having location within the region;

determining, when there is a transmission to a receiving device, a location of the receiving device;

determining, based on the location of the receiving device, the region within which the receiving device is; and using the posteriori probability distribution of the corresponding region when selecting the modulation and coding scheme for the transmission.

7. The apparatus of claim 1, wherein the posteriori probability distribution is a posteriori probability distribution for signal-to-interference-to-noise ratios, which is based on Thompson sampling algorithm, signal-to-interference-to noise ratios conditioned at least on the first feedbacks, and the signal-to-interference-to noise ratios conditioned at least on the second feedbacks.

8. The apparatus of claim 1, wherein the posteriori probability distribution is a posteriori probability distribution for modulation and coding schemes, which is based on Thompson sampling algorithm, modulation and coding schemes conditioned at least on the first feedbacks, and the modulation and coding schemes conditioned at least on the second feedbacks, and wherein the at least one memory and computer program code configured to, with the at least one processor, cause the apparatus further at least to perform storing of selected modulation and coding schemes.

9. A method for an apparatus, the method comprising:

calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus;

convolving the posteriori probability distribution to a higher variance Gaussian probability distribution;

selecting, in response to a transmission to be transmitted from the apparatus, a modulation and coding scheme for the transmission by at least sampling the higher variance Gaussian probability distribution; and using the selected modulation and coding scheme for the transmission.

10. The method of claim 9, further comprising:

updating, in response to receiving a new first feedback, the posteriori probability distribution by using as the newest first feedback the new first feedback, and the previous newest first feedback as one of the older first feedbacks; and updating, in response to receiving a new second feedback, the posteriori probability distribution by using as the newest second feedback the new second feedback, and the previous newest second feedback as one of the older first feedbacks.

11. The method of claim 9, wherein historical data comprises at least the newest first feedback, the plurality of the older first feedbacks, the newest second feedback and the plurality of the older second feedbacks, and wherein the method further comprises:

adding, in response to receiving a first feedback or a second feedback, the first feedback or the second feedback to the historical data and updating the posteriori probability distribution; and using a sliding window when calculating the first probability distribution and the second probability distribution.

12. The method of claim 9, wherein historical data comprises at least the newest first feedback, the plurality of the older first feedbacks, the newest second feedback and the plurality of the older second feedbacks, and wherein the method further comprises:

calculating the first probability distribution using a first batch comprising at least a predefined amount of first feedbacks from the historical data, and the second probability distribution using a second batch comprising at least the predefined amount of second feedbacks from the historical data;

in response to receiving a new first feedback, adding the new first feedback to the first batch and removing the oldest first feedback from the first batch, and updating the posteriori probability distribution; and in response to receiving a new second feedback, adding the new second feedback to the second batch and removing the oldest second feedback from the second batch, and updating the posteriori probability distribution.

13. The method of claim 9, wherein historical data comprises at least the newest first feedback with time information, the plurality of the older first feedbacks with time information, the newest second feedback with time information and the plurality of the older second feedbacks with time information, and wherein the method further comprises:

applying, before calculating the posteriori probability distribution, a forgetting factor, whose value increase with time, to the historical data; and calculating, after applying the forgetting factor, the first probability distribution and the second probability distribution to calculate the posteriori probability distribution.

14. The method of claim 9, wherein at least one cell area is divided into two or more regions, and the method further comprises:

associating feedback with corresponding location information by performing, per a first feedback received from a reporting device, determining a location of the reporting device, and associating the first feedback with the location, and, per a second feedback received to an earlier transmission to a receiving device, associating the second feedback with a location of the receiving device determined for the earlier transmission, or determining and associating the second feedback with a location wherefrom the second feedback is received;

calculating, per a region, a posteriori probability distribution of the region, using first feedbacks having location within the region and second feedbacks having location within the region;

determining, when there is a transmission to a receiving device, a location of the receiving device;

determining, based on the location of the receiving device, the region within which the receiving device is; and using the posteriori probability distribution of the corresponding region when selecting the modulation and coding scheme for the transmission.

15. The method of claim 9, wherein the posteriori probability distribution is a posteriori probability distribution for signal-to-interference-to-noise ratios, which is based on Thompson sampling algorithm, signal-to-interference-to noise ratios conditioned at least on the first feedbacks, and the signal-to-interference-to noise ratios conditioned at least on the second feedbacks.

16. The method of claim 9, wherein the posteriori probability distribution is a posteriori probability distribution for modulation and coding schemes, which is based on Thompson sampling algorithm, modulation and coding schemes conditioned at least on the first feedbacks, and the modulation and coding schemes conditioned at least on the second feedbacks, and wherein the at least one memory and computer program code configured to, with the at least one processor, cause the apparatus further at least to perform storing of selected modulation and coding schemes.

17. A non-transitory computer readable medium comprising program instructions for causing an apparatus to perform at least the following:

calculating a posteriori probability distribution using a first probability distribution and a second probability distribution, wherein the first probability distribution is calculated using at least a newest first feedback and a plurality of older first feedbacks, a first feedback indicating channel quality, and the second probability distribution is calculated using at least a newest second feedback and a plurality of older second feedbacks, a second feedback indicating a success or failure of a transmission transmitted from the apparatus;

convolving the posteriori probability distribution to a higher variance Gaussian probability distribution;

selecting, in response to a transmission to be transmitted from the apparatus, a modulation and coding scheme for the transmission by at least sampling the higher variance Gaussian probability distribution; and using the selected modulation and coding scheme for the transmission.

* * * * *